Dec. 31, 1929.  L. H. CLARK  1,741,756
OIL PURIFYING APPARATUS
Filed May 12, 1925   3 Sheets-Sheet 1

INVENTOR
Lee H. Clark
BY
ATTORNEYS.

Dec. 31, 1929.  L. H. CLARK  1,741,756
OIL PURIFYING APPARATUS
Filed May 12, 1925  3 Sheets-Sheet 2

INVENTOR
Lee H. Clark.
BY
Kenyon and Kenyon
ATTORNEYS.

Dec. 31, 1929.  L. H. CLARK  1,741,756
OIL PURIFYING APPARATUS
Filed May 12, 1925   3 Sheets-Sheet 3
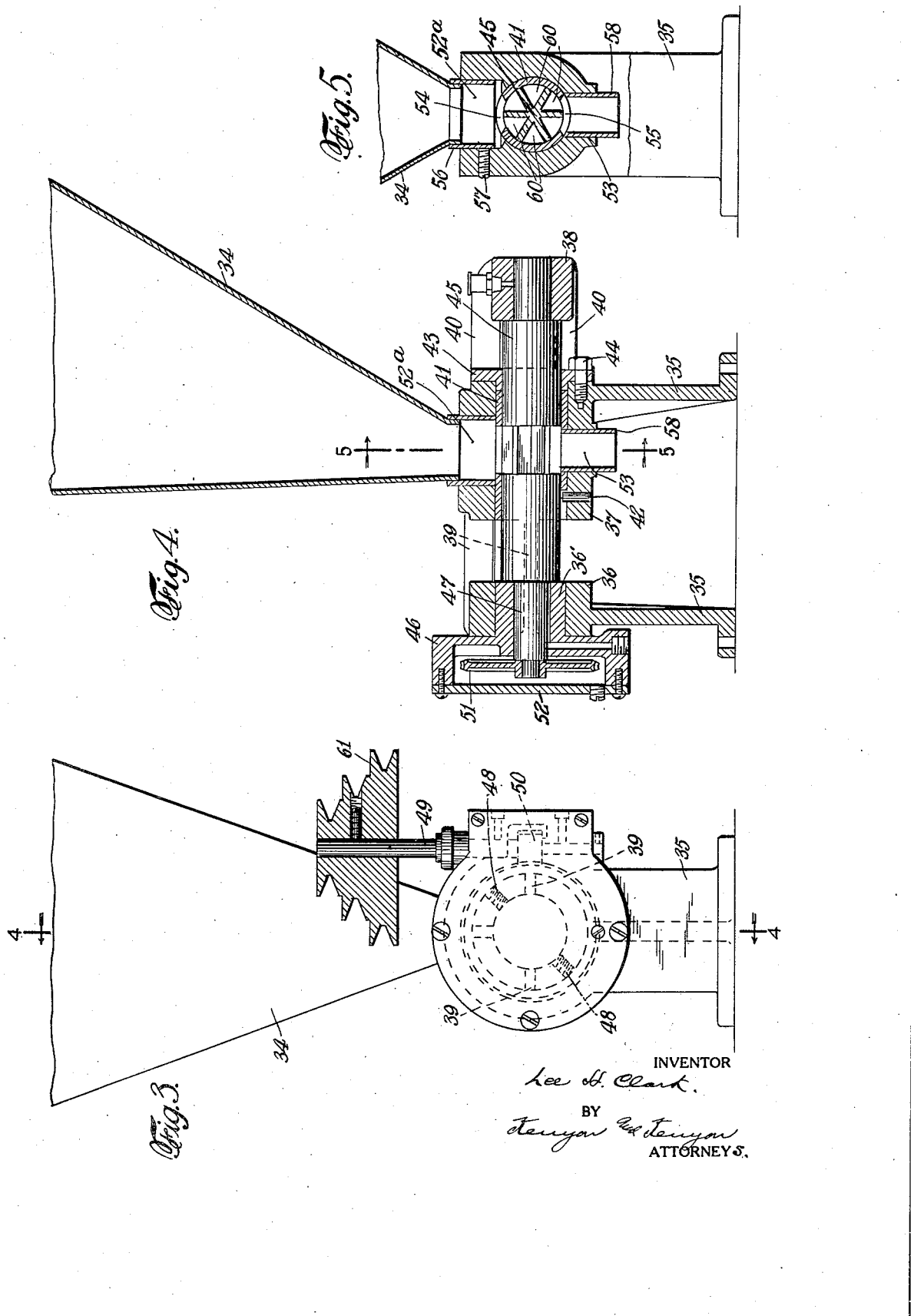
INVENTOR
Lee H. Clark.
BY
Tenyon & Tenyon
ATTORNEYS.

Patented Dec. 31, 1929

1,741,756

UNITED STATES PATENT OFFICE

LEE H. CLARK, OF ROSEMONT, PENNSYLVANIA, ASSIGNOR TO THE SHARPLES SPECIALTY COMPANY, OF PHILADELPHIA, PENNSYLVANIA, A CORPORATION OF DELAWARE

OIL-PURIFYING APPARATUS

Application filed May 12, 1925. Serial No. 29,781.

My invention relates to apparatus for the purification of oils and particularly oils that contain finely divided carbon of which some or all may be in a substantially colloidal state, decomposition products, water, dirt and other impurities, and the acidity of which may be excessive in view of the purpose for which the oil is to be used. Examples of oil that may be purified by the use of my apparatus are oil that has been used for the submersion of electric switches or circuit breakers and electric transformers, used crank case oil of internal combustion engines, and other oils containing similar impurities.

In the practice of my invention aqueous and solid or semi-solid reagents are employed and apparatus embodying my invention includes devices for mixing the oil with such reagents as by agitating the oil therewith, centrifugal machines for effecting separating and clarifying operations, devices for maintaining the oil or mixtures thereof at the proper temperature, and devices for handling oil and reagents and mixtures thereof.

It is an object of my invention to provide an apparatus for carrying out a process of purifying contaminated oil wherein the oil is agitated with a predetermined proportion of an aqueous reagent and passed through a centrifugal separator at a desired temperature to separate from the oil impurities and the aqueous phase of the resulting mixture, the oil being then treated with a reagent, such as a reagent for improving the resistance of the oil to emulsification, and finally clarified. A further object of my invention is to provide an apparatus for the practice of the above described process wherein the flow of oil to be purified is continuous, and whereby the addition of reagents may be regulated as desired, and whereby the mixture of added reagents with the oil may be effected and whereby the temperature of the oil or mixtures thereof in different parts of the system, and also the temperature of different parts of the system itself, may be regulated and maintained at the desired degree. A particular object of my invention is the provision of apparatus whereby the process set forth in my Patent No. 1,553,141, issued September 8th, 1925, on an application copending herewith may be effectively practiced.

Figure 1:
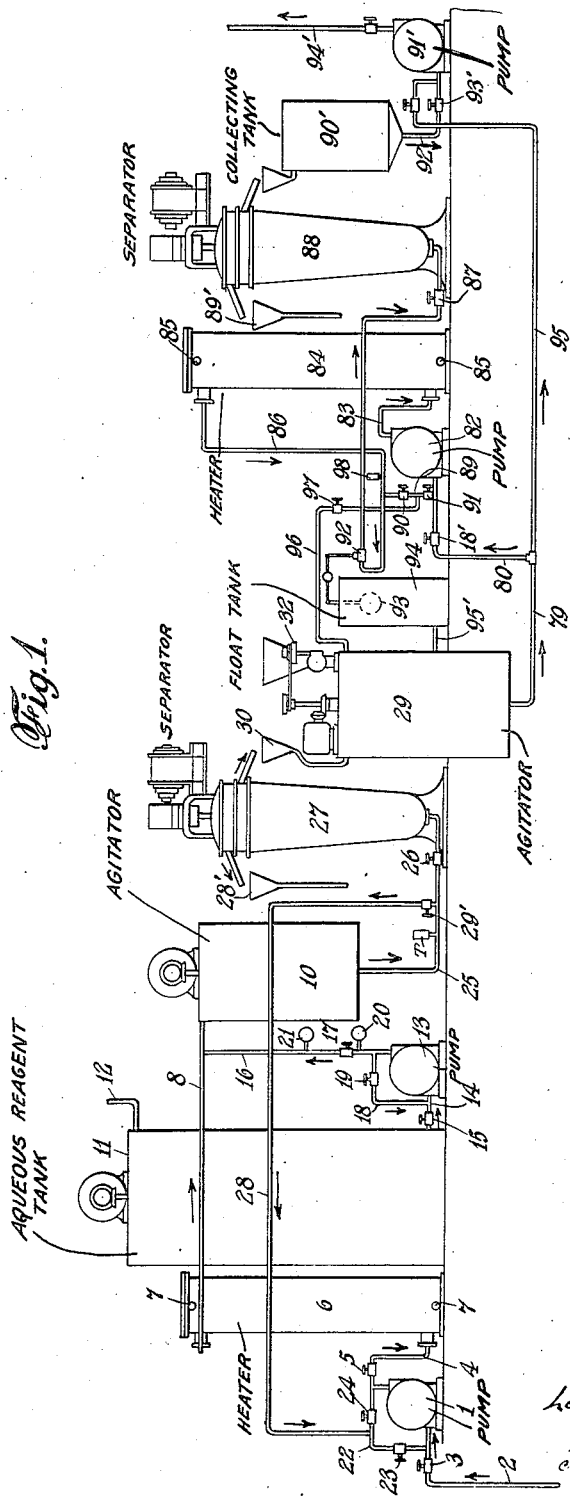
Figure 2:
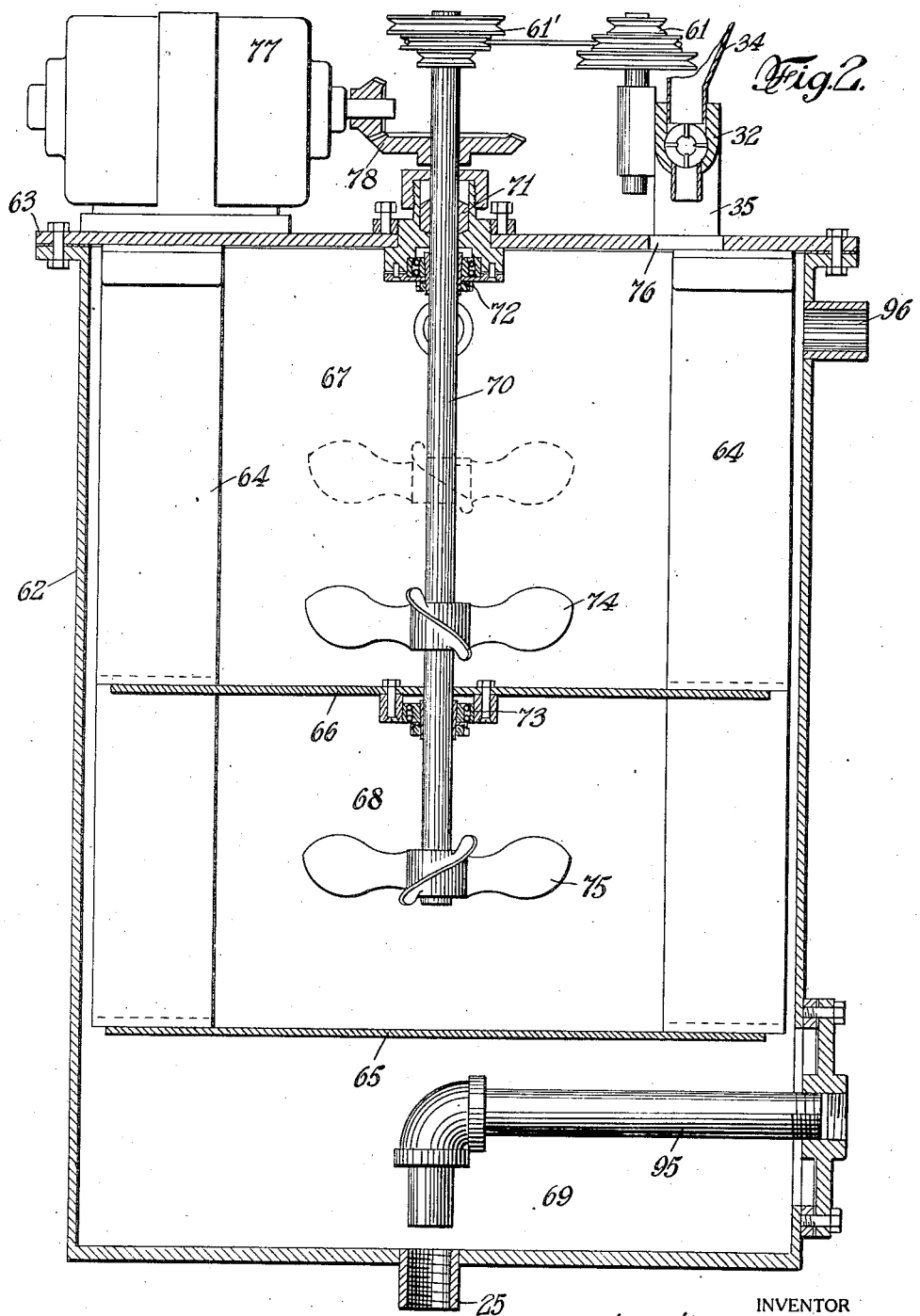

Further objects and advantages of my invention will appear from the following description taken in connection with the accompanying drawings in which, Fig. 1 is a diagrammatic view of apparatus embodying my invention, Fig. 2 is a sectional view taken on a vertical plane with minor parts broken away of an agitating device embodied in the construction shown in Fig. 1, Fig. 3 is an elevation, partly in section of a reagent feeding device embodied in the construction shown in Fig. 1, Fig. 4 is a partial sectional view on the line 4—4 of Fig. 3, and Fig. 5 is a partial sectional view on the line 5—5 of Fig. 4.

Referring to the drawings, contaminated oil, which may be of the character above described, is drawn by means of the pump 1 through the pipe 2 that is controlled by the valve 3, from any suitable storage tank or from the apparatus in which the oil is used. The oil is passed by means of the pump 1 through the pipe 4, that is controlled by the valve 5, to heater 6 that is closed and supplied with any desired heating medium through the pipes 7. From the heater 6 the oil passes through the pipe 8 to the closed agitating tank 10 that is shown in Fig. 2. The desired aqueous reagent is prepared in a tank 11 that is supplied with water through the pipe 12 and may be similar in construction to tank 10. Aqueous reagent is drawn from tank 11 by means of the pump 13 through the pipe 14 that is controlled by the valve 15. The pump 13 passes aqueous reagent through the pipe 16 that is controlled by the valve 17 and leads into the pipe 8. A by-pass pipe 18 extends from the discharge pipe 16 of the pump 13 to the intake pipe 14 of the pump 13 and is provided with a relief valve 19. Thus, when the pump 13 is pumping more aqueous reagent than is passing through the valve 17 such excess will merely pass back through the relief valve 19 into the inlet pipe 14. Connected to the pipe 16 are gauges 20 and 21 that are positioned respectively below and above the valve 17 that is preferably a needle valve. Between the discharge pipe 4 of the pump 1 and the intake pipe 2 of the pump 1 there is a by-pass pipe 22 that includes the relief valve 23 and the control valve 24.

From the bottom of the agitating tank 10 the pipe 25 controlled by the valve 26 conducts the agitated mixture of the aqueous reagent and the oil to the centrifugal separator 27. A pipe 28, controlled by the valve 29' leads from the pipe 25, ahead of the valve 26, to the by-pass pipe 22. Impurities of the oil and the aqueous phase of the mixture produced in the agitator 10 are separated from the oil in the centrifugal separator 27 and discharged into the waste pipe 28'. Oil separated from the mixture in the centrifugal separator 27 is discharged into the conduit 30 that leads into a collecting and agitating tank 29.

In the purification, by means of apparatus embodying my invention, of oil containing impurities above referred to, for example oil that has been used to submerge electric switches and circuit breakers, the aqueous reagent that is prepared in the reagent tank 11 may constitute an aqueous solution that has the property of being dispersed more easily throughout the oil and the property of causing impurities to be removed from the oil or by being put into a state wherein their removal may be effected by the use of apparatus embodying my invention. The aqueous reagent is preferably sufficiently dilute that any products of a reaction between the reagent and the oil or impurities thereof will be in solution in the reagent. Under certain circumstances it may be desirable that the reagent include a substance in colloidal form. It is advantageous that the reagent have an available, though not in every case initially free, alkalinity equivalent to the alkalinity of a solution containing 0.25% to 1% by weight of caustic soda. A colloidal condition is advantageously attained by introducing into the reagent substances varying from finely divided silica to such substances as aluminum hydroxide. Sodium silicate produces a desirable colloidal condition and also produces the necessary alkalinity. And sodium silicate comprising 3.25 parts by weight of $SiO_2$ to each part of $Na_2O$ has been found effective. The reagent is prepared in the reagent tank 11 that is provided with agitating means similar to the agitating means in the tank 10, the details of said means being more particularly shown in Fig. 2. In the practice of my invention I have obtained good results by the use with nine parts of oil, of one part of an aqueous solution containing 2% by weight of sodium silicate of the composition above set out, the reagent being mixed with the oil, as in the agitator 10.

Mounted upon the collecting tank 29 which is also an agitating tank is a feeding device 32 for introducing into the oil in tank 29 fuller's earth or other decolorizing clays or any similar adsorptive material. The feeding device comprises a hopper 34 for containing the fuller's earth (see Figs. 3, 4 and 5) and a supporting member comprising legs 35 and support 37 and housing 36, the bearing housing 36 and support 37 being connected by the arms 39.

The support 37 is provided with a bushing 41 held in place by the pin 42 and the cap member 43 that is secured to the support by the bolt 44. Bearing 38 is connected with cap 43 by arms 40. The frame 46 fits into the housing 36. A shaft or feeding member 45, is mounted for rotation in the bearing 38 and the bearing 36' which is a part of frame 46. The frame 46 is held in desired angular position within the housing 36 by means of set screws 48 that pass through the housing 36. Shaft 49 is mounted for rotation in the frame 46 and carries a worm 50 that engages the worm wheel 51 that is secured to the end of the shaft 45. A cover plate 52 closes the end of the frame 46. The support 37 is provided with an inlet opening $52^a$ and an outlet opening 53 and the bushing 41 is provided with registering openings 54 and 55. As a convenient construction a thimble 56 is inserted in the opening $52^a$ and held in place by a set screw 57 and the hopper 34 fits into the thimble 56. An outlet pipe 58 is fitted into the outlet opening 53. The shaft 45 is provided with pockets 60 that register with the openings 54 and 55 in the bushing 41. The shaft 49 is provided with a step-pulley 61 whereby the shaft or feeding member 45 is rotated through the worm and worm wheel 50—51 in order to carry fuller's earth from the hopper to the discharge pipe 58 when the pulley 61 is driven as hereinafter described.

The agitating tank 10 and the collecting and agitating tank 29 are similar in construction with differences that are obvious or will be pointed out. Referring to Fig. 2, the agitating tanks comprise a tank body 62 and a cover 63 that is removably attached to the body 62. Attached to the cover 63 are hangers 64 upon which are supported the baffle plate 65 and the baffle plate and bearing support 66. The baffle plate 66 forms with the cover 63 a compartment 67, and a compartment 68 is formed between the plates 65 and 66. A discharge compartment 69 is formed between the baffle plate 65 and the bottom of the tank body 62. There is a space between the outer edges of the plates 65 and 66 and the inner wall of the tank body 62. A shaft 70 extends through the cover 63 and a packing gland 71 and a bearing 72 for said shaft 70 are supported in the cover 63. The plate 66 carries a bearing 73 through which the shaft 70 extends. Positioned upon the shaft 70 are an agitating wheel 74 located in the compartment 67 and an agitating wheel 75 located in the compartment 68. The agitating wheel 74 is adjustably fixed upon the shaft 70 and is set at the upper position shown in Fig. 2 when the agitating tank is closed, for example, when it is used for agitating aqueous reagent and oil, and set at the lower position shown in Fig. 2 when the agitating tank is used to mix fuller's earth and oil and is open.

In Fig. 2 the agitating tank is shown as provided with the device 32 for feeding adsorptive material. The tank is therefore shown as provided with an opening 76 that would be closed if the agitator is used to mix oil and aqueous reagent. The shaft 70 is operated by the motor 77 through the gears 78 and carries a step pulley 61' that drives the pulley 61 so that the speed of operation of the adsorptive material feeding device may be proportional to the speed of operation of the agitating wheels 74 and 75.

Leading from the bottom of the collecting and agitating tank 29 is branched pipe 79, of which one branch 80 controlled by the valve 18' leads to the pump 82 of which the discharge 83 leads to a heater 84 that is supplied with any desired heating medium through the pipes 85. From the heater 84 oil is lead by means of the pipe 86 that is controlled by the valve 87 to the centrifugal machine 88. Between the pipes 86 and the suction pipe 80 of the pump 82 is a by-pass 89 that includes a relief valve 90 and a control valve 91. In the pipe 86 is a valve 92 that is controlled by the float 93 of the float tank 94 that communicates by means of pipe 95' with the collecting and agitating tank 29. The centrifugal machine 88 may be of the clarifier type and retain one separated substance within the bowl, or it may be operated as a separator discharging one substance into the waste pipe 89', while the oil in either case is being discharged into the collecting tank 90' from which oil is drawn by the pump 91' through the pipe 92' having the valve 93', the oil being thereafter discharged into storage through the pipe 94'.

In the operation of apparatus embodying my invention, impure oil is drawn by the pump 1 through the pipe 2 and passed through the pipe 4 to the heater 6 and then through the pipe 8 to the agitating tank 10. Reagent that has been prepared in the tank 11 is passed by the pump 13 into the pipe 8 and thence into the agitating tank 10. The amount of reagent entering the oil is controlled by the needle valve 17 and the pump 13 is so operated that the pressure shown by the gauge 20 is slightly higher than the pressure shown by the gauge 21. Any excess reagent passes through the relief valve 19 of the by-pass 18 back to the suction pipe of the pump 13. The agitating tank 10 is closed and the mixture is under pressure therein. The flow of mixture to the centrifugal separator is controlled by the valve 26. If the valve 24 is open any excess of impure oil pumped by the pump 1 will be passed through the relief valve 23 back to the suction pipe of that pump. In order to bring the pipes leading up to the centrifugal separator 27 and the agitating tank and the oil therein up to the desired temperature the valve 26 may be closed and the valve 29' opened so that oil or mixture will be circulated through the heater 6, pipe 8, agitating tank 10 and pipe 28 and relief valve 23 back to the suction pipe of pump 1 in which case the valve 24 may or may not be open. By use of the apparatus so far described an aqueous reagent of the desired character may be mixed with impure oil in the desired proportions and the mixture may be brought to the desired temperature shown by thermometer T, for example 150°–180° F., before being introduced to the centrifugal separator 27. The provisions for by-passing the oil around pump 1 and the reagent around pump 13 and the oil or mixture from the feed pipe of the centrifuge to the intake side of the pump 1 insure that a sufficient supply of oil and reagent will always be available, and the flow thereof can be controlled by the mere regulation of a valve, and insure that the mixture and various parts of the system will be maintained at the desired temperature. If the oil collected in tank 29 possesses the desired characteristics, it may be passed through the branch 95 of the pipe 79 to the intake side of the pump 91' and delivered to storage. But, if the oil collected in tank 29 requires clarification it may be passed through the branch 80 of pipe 79 to the centrifugal machine 88, such further centrifugal machine being employed for the purpose of removing such impurities as moisture. If it be desirable to further purify the oil collected in tank 29 as by improving its resistance to emulsification, adsorptive material may be added to that oil by means of the feeding device 32 and agitated with that oil by means of the oppositely impelling agitators 74 and 75. In order to insure that oil entering the centrifugal machine 88 shall be at the desired temperature, the valves 87 and 91 may be closed and oil will then pass through the relief valve 90 and the pipe 96, that is controlled by the valve 97, back to the tank 29. The contents of the tank 29 will thus be circulated through the heater until the temperature of the oil as indicated by the thermometer 98 is at the desired degree. The valve 97 is then closed and the valves 91 and 87 are opened, the valve 87 being adjusted to the requirements of the centrifugal machine. The flow to the centrifugal machine 88 will, however, be controlled through the valve 92 by the level of liquid in the agitating tank 29 that will determine the level of liquid in the float tank 94. The construction of tank 29 for agitating adsorptive material with oil is in general the same as the construction of tank 10 for agitating oil with aqueous reagent except that tank 10 is closed and does not embody the pipe 95 and the mechanism for introducing adsorptive material and the pipe 96 is replaced by a supply pipe 8.

In the practice of my invention the amount of adsorptive material added to the contents of tank 29 will not substantially exceeds 1% by weight of the oil and the addition of that small quantity of adsorptive material is effective, after treatment of the oil with an aqueous reagent of the character above described and after separation in a centrifugal machine of the aqueous phase of the mixture so produced, to produce a purified oil having a desired resistance to emulsification. There is great economy in effecting the desired purification by the use of so small a quantity of adsorptive material and, since the adsorptive material is retained within the bowl of the centrifugal machine 88, the use of a small quantity thereof permits prolonged operation of the apparatus without cleaning the bowl of the centrifugal machine 88.

The agitating devices constitute an advantageous feature of my invention in that they produce the desired degree of agitation while oil is flowing continuously through the system, the construction whereby all parts are supported from the cover plate of the tank being of considerable advantage in cleaning the tank and adjusting the parts.

From the foregoing it will be apparent that my invention provides apparatus whereby oil containing the impurities above mentioned may be brought to the desired degree of purification. It will also be apparent that in the purifying operation a ready and sufficient supply of impure oil and aqueous reagent is maintained, that desired proportioning of aqueous reagent with the oil is readily effected, that the desired degree of dispersion of the aqueous reagent through the oil is insured, that the temperature of the oil and of mixtures thereof and of various parts of the system is effectively attained and maintained, that oil discharged from the centrifugal separator may be passed to storage or further purified as desired, and that the proportioning of adsorptive material with the oil and the agitation thereof with the oil are readily effected. It is also apparent that in the practice of my invention the oil supplied to the centrifugal clarifier will be at the desired temperature) that the withdrawal of oil from the collecting tank that receives oil from the centrifugal separator is dependent upon the level of oil in that tank so that passage of oil from the centrifugal separator to the centrifugal clarifier may be delayed. It will also be apparent that I have provided an effective device for feeding adsorptive material; and that I have provided an effective and well constructed agitating device.

While I have described apparatus embodying my invention in great detail it is to be understood that I am not limited to those details but that my invention shall include such variations and modifications as fall within the hereunto appended claims.

What I claim as new and desire to secure by Letters Patent is:

1. Apparatus for the purification of used oil comprising a tank, means for supplying used oil to the tank, means for supplying aqueous alkaline reagent to the tank, means for agitating the mixture in the tank, means for heating the contents of the tank, a centrifugal separator for receiving heated and agitated mixture from the tank and adapted to separate oil from impurities and reagent and to discharge the oil separately from the impurities and reagent; a centrifugal clarifier adapted to receive oil discharged from the separator after removal of impurities and reagent therein and to remove from the oil impurities not removed therefrom in said separator, and means for conducting into said clarifier oil discharged from said separator.

2. Apparatus for the purification of used oil comprising means for dispersing aqueous alkaline reagent through the oil to be purified, a centrifugal separator for receiving mixed oil and reagent from said dispersing means and adapted to separate oil from impurities and reagent; a collecting tank for receiving separated oil from the separator and having an outlet, means for controlling the flow of oil from said outlet of said collecting tank in accordance with the quantity of oil collected therein, and a centrifugal oil clarifier for receiving the controlled discharge of oil from the outlet of said collecting tank.

3. Apparatus for the purification of used oil comprising means for dispersing aqueous alkaline reagent throughout the oil to be purified, a centrifugal separator for receiving mixed oil and reagent from said dispersing means and adapted to discharge oil separately from reagent and impurities, a collecting tank for receiving oil discharged from the centrifugal separator, a centrifugal clarifier, means for conducting collected oil from the collecting tank to the clarifier, and means for delaying the transfer to said clarifier by said conducting means of oil collected in said tank.

4. Apparatus for the purification of used oil comprising a centrifugal separator, means for feeding a mixture of oil and aqueous alkaline reagent to the separator, said separator being adapted to discharge oil separately from reagent and impurities, a collecting tank for receiving oil discharged from said separator, a pump for withdrawing oil from said collecting tank, a heater for receiving oil from said pump, a valve-controlled pipe conducting oil from said heater, a centrifugal clarifier for receiving oil from said pipe beyond said valve, and a valve by-pass to said collecting tank and leading from said pipe at a point ahead of said valve.

5. Apparatus for the purification of used oil comprising separate pumps for used oil and for alkaline reagent and each having a relief by-pass, an agitator, a conduit including a heater and leading from said oil pump to said agitator, a valve-controlled pipe leading from said reagent pump to said conduit, a pipe leading from said agitator and having valved branches, a connection between one of said valved branches and the relief by-pass of said oil pump, and a centrifugal separator adapted to receive mixture from the other of said valved branches and adapted to discharge oil separately from reagent and impurities.

6. Apparatus for the purification of used oil comprising a pump for used oil, a heater for receiving oil from said pump, a closed agitator, a pipe for conducting oil from said heater to said agitator, means for introducing alkaline reagent into said pipe under pressure at a controlled rate, a second pipe for conducting mixture from said agitator and having valved branches, a connection between one of said branches and the intake of said pump, and a centrifugal separator for receiving mixture from the other of said branches and adapted to discharge oil separately from impurities and reagent.

7. In apparatus for the purification of used oil, the combination of a tank for oil, a first pipe leading from said tank, a pump having its intake connected to said pipe, an oil heater for receiving oil discharged from said pump, a second pipe for conducting oil from said heater, a centrifugal machine for receiving oil from said second pipe and adapted to purify and discharge the same, a valve in said second pipe and controlled by the level of liquid in said tank, and a valved by-pass leading from said second pipe at a point ahead of said valve to the intake of said pump.

8. In apparatus for the purification of used oil, the combination of a centrifugal separator adapted to separate and separately discharge oil from its mixture with impurities and aqueous solutions, means for feeding mixture of oil and aqueous alkaline reagent to said separator, an agitator for receiving oil discharged from said separator, means for feeding adsorptive material to said agitator, a pump for drawing mixture from said agitator, a heater for receiving mixture from said pump, and a centrifugal clarifier for receiving heated mixture from said heater and adapted to remove adsorptive material and moisture from the oil.

9. In apparatus for the purification of used oil, means for mixing an alkaline reagent with the oil to be purified, a centrifugal separator for receiving mixture from said mixing means and adapted to discharge oil separately from reagent and impurities, an agitator for receiving oil from said separator, means for feeding adsorptive material to oil in said agitator, a mixture pipe leading from said agitator, a pump having its inlet connected to said pipe, a heater for receiving mixture from said pump, a centrifugal clarifier, a second pipe for conducting mixture from said heater to said clarifier and having a controlling valve, a relief by-pass leading from said second pipe at a point ahead of said valve to the intake of said pump.

10. In apparatus for the purification of used oil, a centrifugal separator adapted to discharge oil separately from impurities and immiscible liquids, an agitator for receiving oil from said separator, means for feeding adsorptive material to said agitator, a centrifugal clarifier adapted to remove adsorptive material and moisture from oil, a pump for receiving mixture from said agitator and passing it to said clarifier, and a relief by-pass extending from the discharge side of said pump and having valved branches extending respectively to said agitator and to the intake side of said pump.

11. Apparatus for the purification of used oil comprising a closed agitator, means for forcing used oil to be purified into said agitator, means for introducing aqueous alkaline reagent at a controlled rate into said agitator, means for heating the contents of said agitator, a centrifugal separator for receiving mixture from said agitator at a controlled rate and adapted to discharge oil separately from reagent and impurities, a second agitator for receiving oil from said separator, means for introducing adsorptive material into oil in said second agitator, means for heating mixture produced in said second agitator, and a centrifugal clarifier for receiving heated mixture from said second agitator and adapted to discharge oil separately from adsorptive material.

In testimony whereof, I have signed my name to this specification.

LEE H. CLARK.